A. S. SWAN AND J. A. YEATS.
CHASSIS FOR SIDE CARS OF MOTORCYCLES.
APPLICATION FILED DEC. 22, 1919.

1,388,387.

Patented Aug. 23, 1921.
3 SHEETS—SHEET 1.

Fig. 2ª

Inventors
A. S. Swan & J. A. Yeats,
By H. R. Kerslake
Attorney

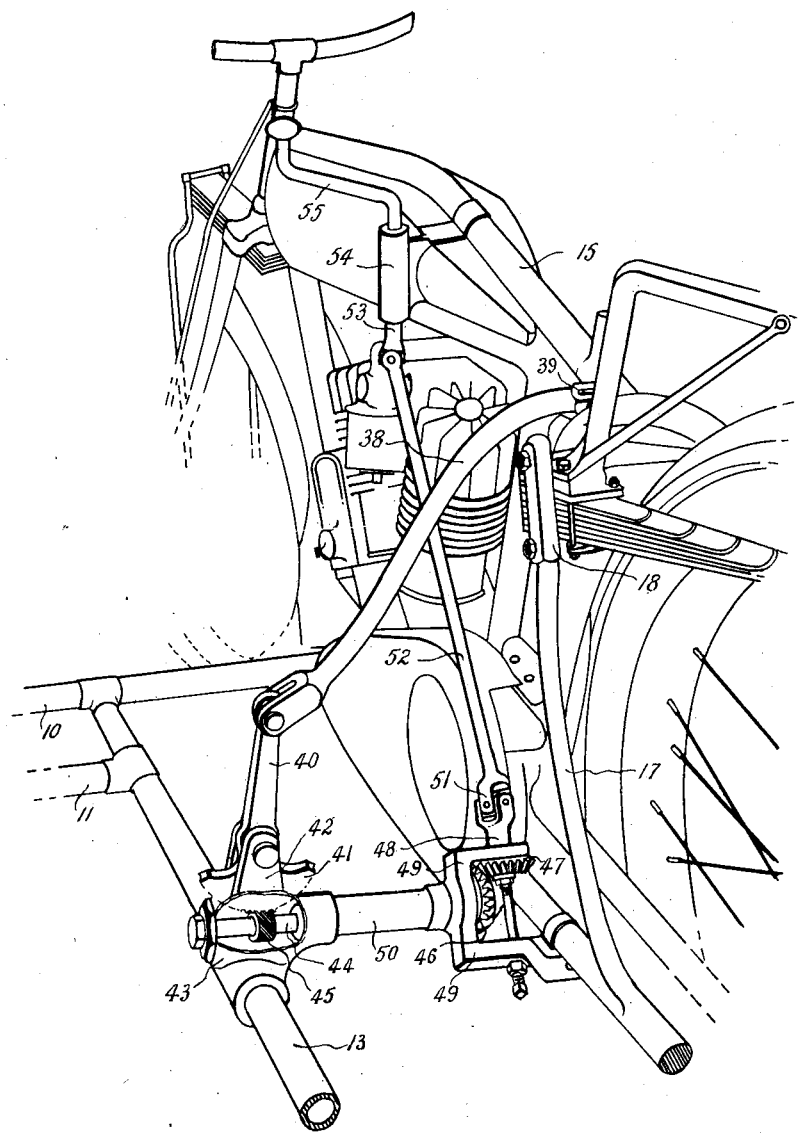

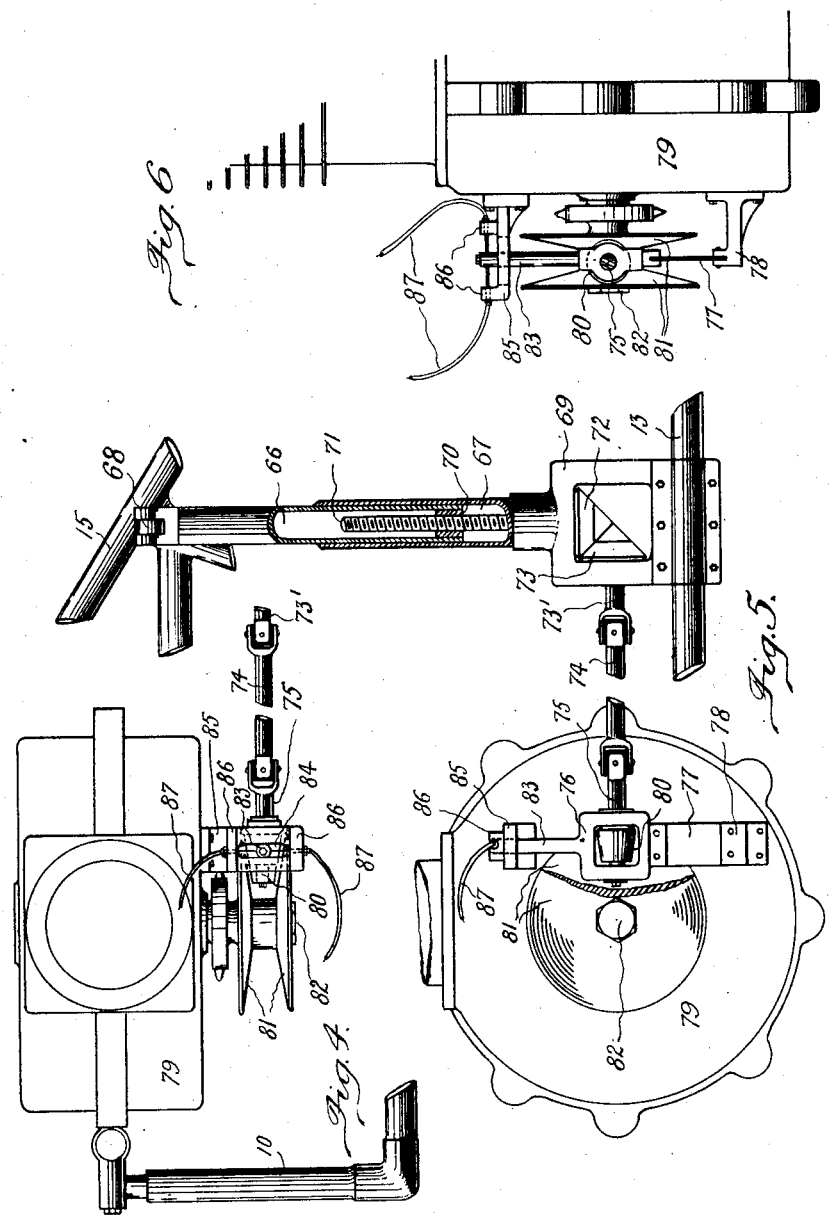

UNITED STATES PATENT OFFICE.

ALBERT SAMUEL SWAN, OF COBURG, AND JOHN ALBERT YEATS, OF RICHMOND, VICTORIA, AUSTRALIA.

CHASSIS FOR SIDE CARS OF MOTORCYCLES.

1,388,387. Specification of Letters Patent. Patented Aug. 23, 1921.

Application filed December 22, 1919. Serial No. 346,780.

*To all whom it may concern:*

Be it known that ALBERT SAMUEL SWAN and JOHN ALBERT YEATS, blacksmith and mechanic, respectively, subjects of the King of Great Britain, residing at 98 The Avenue, Coburg, and 295 Lennox street, Richmond, respectively, in the State of Victoria, Commonwealth of Australia, have invented certain new and useful Improvements in and Connected with Chassis for Side Cars of Motorcycles, of which the following is a specification.

This invention relates to improvements in and connected with side cars of motor cycles and refers more particularly to means for connecting a side car and chassis thereof to a motor cycle whereby the angle of one to the other may be adjusted to facilitate the turning of corners or taking curves when in motion and also means whereby the wheel of the side car itself will automatically "track" or "trail" in line with the motor cycle.

The object of the present invention is to provide means whereby the angle between the cycle frame and the side-car chassis may be adjusted so that the said cycle may be easily and quickly tilted either to or from the side car to facilitate the turning of corners and whereby uneven wear on tires, side strain on the cycle and other stresses incident to the use of the rigid type of side car chassis are eliminated. A further object of the invention is the provision of means whereby the side car wheel will be free to turn or "track" with the cycle at an angle corresponding to that taken by the cycle in passing around a curve.

We accomplish the above mentioned object by hinging or pivoting the chassis frame upon the cycle frame in the same horizontal line and preferably in the central vertical plane and providing adjustable stays or connections whereby the angle between the two frames may be adjusted to permit of the tilting of the cycle and the side car in rounding curves. We also provide a subsidiary frame pivotally mounted on the side car chassis for supporting the side car wheel whereby it will automatically "track" or "trail" or turn in the direction taken by the cycle in rounding curves.

In order that the invention may be readily understood reference will now be had to the accompanying sheets of explanatory drawings wherein—

Figure 2:
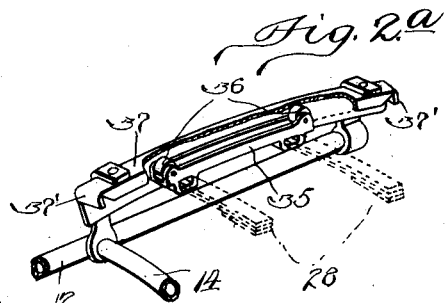
Fig. 2 is a view in perspective showing the subsidiary frame for supporting the side car wheel and means for connecting it to the chassis.
Figure 2:
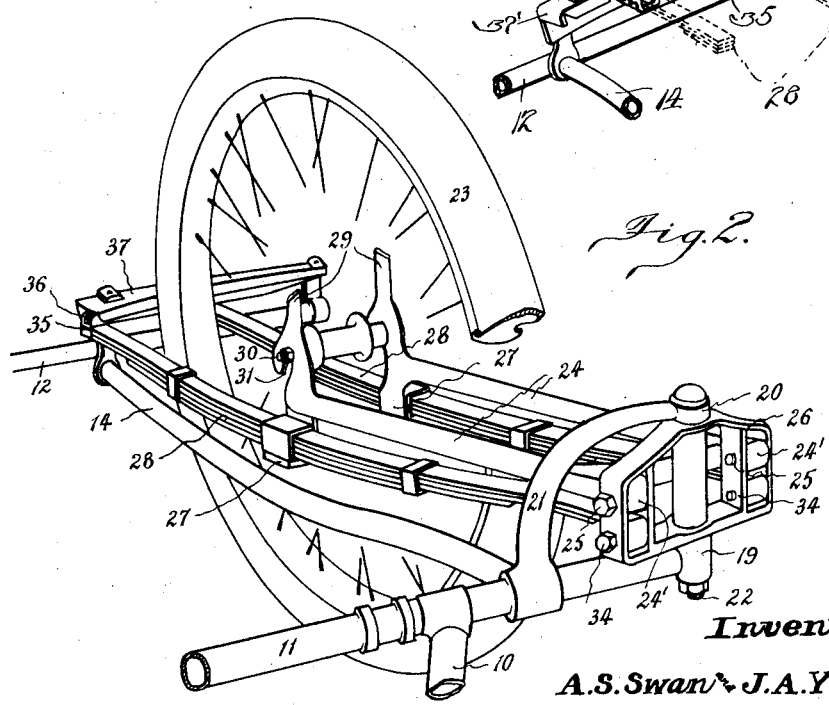

Fig. 2ᵃ is a perspective view partly in section of a detail.

Fig. 3 is a view in perspective showing the adjustable means for connecting the side car chassis to the frame of a motor cycle.

Figs. 4 and 5 are views in plan and side elevation respectively of part of a motor cycle engine and shows a modified form of gearing for tilting the cycle.

Fig. 6 is a view in rear elevation of part of Fig. 5 and hereinafter is fully described.

In these drawings the chassis frame is shown formed of three transverse members 10, 11, and 12, and two longitudinal members 13 and 14, the inner ends of the forward and rear transverse members 10 and 12 being pivotally connected to the frame 15 of the cycle in or approximately in the central vertical plane thereof. The front transverse member 10 is pivotally connected to a lug or bracket 16 fitted to or formed on the front bar of the cycle frame 15 and the rear transverse member 12 is pivoted to a supporting bar 16' at a point behind the rear wheel of the cycle.

The supporting bar 16' may be connected to the frame of the cycle and pass rearwardly in the form of a yoke around the back wheel, or when the back wheel is resiliently suspended as shown in the drawings the supporting bar 16' and stays 17 formed thereon may be clamped to the frame 15 at points marked 18 or in any other approved way.

The pivot points of the chassis frame preferably are arranged in alinement with each other and the said frame may be strengthened by means of diagonal bars, not shown.

The adjustable connection between the cycle frame and the side-car chassis comprises a stay or link 38 one end of which is pivotally connected to the cycle frame as at 39 and the opposite end to an arm 40 formed on a sector 41 pivotally mounted in a jaw 42 formed on a bearing 43 fitted to the inner longitudinal member 13 of the side car chassis. The bearing 43 takes a spindle 44 on which is mounted a worm wheel 45 meshing with the sector and the end of the said spindle nearest the cycle is provided with a bevel gear wheel 46 which meshes with a like gear wheel 47 fitted to a spindle 48 rotatably mounted in bearings 49 fitted loosely to the cycle frame. The bearing 43 and the bearing 49 are connected by a piece of tubing 50 through which the spindle 48 is adapted to pass.

The bearings 49 preferably are pivotally connected to the cycle frame in line with the bearings of the side car chassis but when disposed as shown in Fig. 3 of the drawings their connection with the frame of the cycle must be sufficiently loose to allow of free movement of the chassis without permitting any undue displacement under working stresses.

The upper end of the spindle 48 is connected by a universal joint 51 to a rod 52 which is connected in a like manner to a bar 53 rotatably mounted in a bearing 54 fitted to the cycle frame. The upper end of the bar 53 is provided with a cranked handle 55 by operating which the rider of the cycle can impart motion in either direction to the worm wheel 45 so as to cause the sector arm 40 to move inward or outward and thereby shorten or lengthen the connection between the chassis and the cycle frame to tilt the latter inward or outward as desired.

The chassis of the side car normally is retained at right angles to the cycle frame and by adjusting the connection between the two to tilt the cycle as required the machine may be made to take more or less sharp corners at a rapid rate of speed without danger to the rider of the cycle or passenger in the side car. The connections may also be adjusted to tilt the cycle in either direction so as to keep it quite vertical when the wheel of the side car is traveling on higher or lower ground as when passing along a highly cambered road or the side of a hill.

The tilting of the cycle in the manner above described eliminates all strains due to the centrifugal force set up in rounding curves by altering the center of gravity and permits the steering of the cycle to be easily accomplished.

The mechanical means for adjusting the angle between the cycle frame and the side car chassis may be operated by the movement of the engine of the cycle. This is effected by a modified form of gearing shown in Figs. 4 5 and 6 wherein the adjustable connection between the cycle frame and the side car chassis comprises a pair of telescopic tubes 66 and 67. The tube 66 is pivoted at 68 to the cycle frame and its lower end fits snugly within the upper end of the tube 67 which is fitted to a bracket 69 secured to the inside member 13 of the chassis.

The lower end of the tube 66 is fitted with a nut 70 which is adapted to engage a screwed rod 71 having its lower end passing through the bracket 69 and fitted to a bevel gear wheel 72 adapted to mesh with a like wheel 73 fitted to a shaft 73' projecting forwardly at right angles to the said screwed rod.

The forward end of the shaft 73' is connected by a universal joint to a shaft 74 which is connected in a like manner to a spindle 75 mounted revolubly in bearings in an open frame 76. The open frame 76 is supported by a flexible piece of spring steel 77 which is fitted to and projects vertically from a bracket 78 fitted to the crank case 79 of the engine.

The spindle 75 is fitted with a conical friction wheel 80 which is located within the open frame 76 in such a position that it may be moved laterally into contact with correspondingly tapered friction disks 81 fitted to a projecting end of the crank-shaft 82 of the engine.

The open frame is formed with a vertical extension 83 which is movably supported in a slot 84 formed in a bracket 85 fitted to the crank case of the engine.

The bracket 85 on each side of the slot 84 is provided with upstanding lugs 86 through which the ends of "Bowden" wires 87 pass and are connected to the extension 83 of the open frame. The "Bowden" wires pass to hand levers (not shown) pivotally mounted on the handle bars of the cycle and by operating the said levers the friction wheel is brought to bear against one or other of the friction disks 81 and the screwed rod 71 is rotated in the direction required to lengthen or shorten the connection between the cycle frame and the chassis.

The tilting of the cycle in the manner above described eliminates all strains due to the centrifugal force set up in rounding curves and permits of the steering of the cycle to be easily accomplished.

The outer end of the transverse member 11 of the chassis projects beyond the longitudinal member 14 and terminates in a boss 19 which is arranged in vertical alinement with a boss 20 on a stay 21 carried by the chassis.

A bolt or pin 22 is supported vertically in the bosses 19 and 20 and to this bolt or pin is pivoted the forward end of a subsidiary frame adapted to support the side car wheel 23.

The subsidiary frame comprises a yoke shaped member 24 the forward and closed end of which is provided with horizontal bosses 24' adapted to pivot on bolts 25 passing horizontally through the sides of an oscillating bracket 26 mounted on the pivot bolt or pin 22.

The rear and open end of the yoke shaped member 24 is provided with L shaped lugs 27 to which are clamped the center of semi-elliptic springs 28 in any approved way. The ends of the yoke shaped member are turned upwardly to form a bow 29 which passes over the top of the side car wheel 23 the axle 30 of which is supported in downwardly opening recesses or slots 31 formed in the ends of the said yoke shaped members. (See Fig. 2 of the drawings.)

Figure 1:
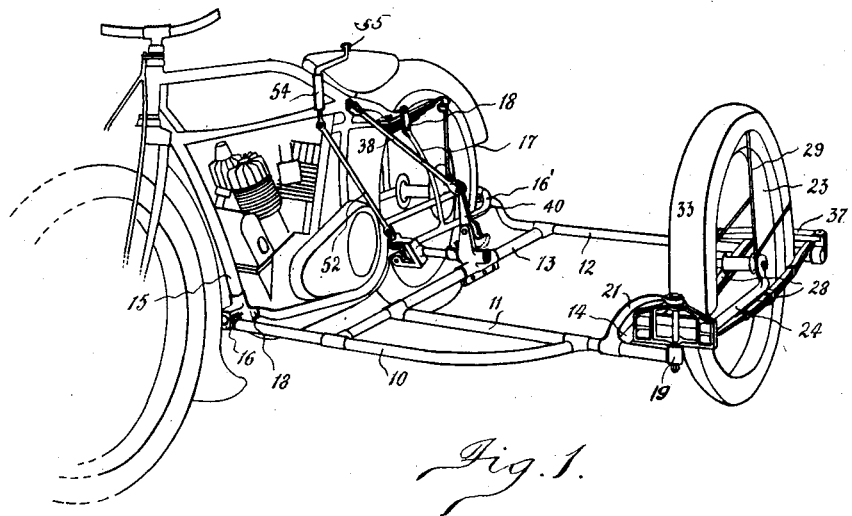
Figure 1 is a view in perspective showing the invention connected to a motor cycle.

The bow 29 connecting the rear ends of the yoke shaped member 24 serves to strengthen the subsidiary frame and may be utilized to support the center part of a mud guard 33 as shown in Fig. 1.

The forward ends of the semi-elliptic springs 28 are carried by bolts 34 passing horizontally through the oscillating bracket 26 below the bolts 25 while the rear ends of the said springs are connected by a channel shaped bar 35 provided with a series of anti-frictional rollers 36 which are adapted to bear on a curved guide 37 fitted to an extension on the outer end of the rear transverse member 12 of the chassis. The curved guide 37 is sufficiently long to permit of a required pivotal movement of the subsidiary frame and stops 37' may be provided for limiting the lateral movement of the said frame and side car wheel.

A side car wheel supported as above described will swing laterally quite freely so as to adjust itself to track accurately with the wheels of a cycle when turning corners thereby obviating excessive wear on the tire of the said side car wheel and minimizing the end thrust on the hub of the same.

While we have shown in the drawings only one adjustable connection between the cycle frame and chassis it will be obvious that two adjustable connections may be employed both of which may be operated in unison by suitable gearings controlled from the hand lever 55 or from the engine of the cycle.

The transverse members of the chassis are fitted with spring suspension devices for resiliently supporting a side car body and these suspension devices can be constructed and arranged in any approved way.

The chassis can be used as a rigid construction by keeping the parts of the adjustable connections locked in their normal positions or as a flexible chassis by operating the said connections as above described.

A side car chassis constructed as above described will obviate all side strain on the cycle and any tendency to side slipping, uneven wear on tires and it will insure increased comfort to the passenger in the side car as well as to the rider of the cycle.

We claim—

1. A chassis for side cars of motor cycles comprising a frame having pivotal connections with the frame of the cycle, and adjustable connection between the chassis frame and the frame of the cycle, and means for effecting an adjustment of the said connection to tilt the cycle to and from the chassis when the said cycle is in motion.

2. A chassis for side cars of motor cycles comprising a frame having pivotal connections with the frame of the cycle, said pivotal connections being in the central vertical plane of the cycle, an adjustable connection between the chassis frame and the frame of the cycle, and means for effecting an adjustment of the said adjustable connection to tilt the cycle to and from the chassis when the said cycle is in motion.

3. A chassis for side cars of motor cycles comprising a frame having pivotal connections with the frame of the cycle, an adjustable connection between the chassis frame and the frame of the cycle, means for altering the length of the adjustable connection to tilt the cycle to and from the chassis when the said cycle is in motion, and a subsidiary frame pivotally mounted on the chassis having means for supporting a side car wheel whereby it will automatically turn in the direction taken by the cycle in rounding curves.

4. A chassis for side cars of motor cycles comprising a frame having pivotal connections with the frame of the cycle, an adjustable connection between the chassis frame and the frame of the cycle, a subsidiary frame having its forward end pivotally mounted on the outer side of the chassis frame, a side car wheel resiliently suspended in the subsidiary frame, and a curved guide on the rear of the chassis frame for movably supporting the rear end of the subsidiary frame.

5. In a chassis for side cars of motor cycles the combination with a main frame of the chassis, of a subsidiary frame pivotally connected to the outer side and front part of the main frame whereby its rear end may swing laterally, a side car wheel resiliently suspended in the subsidiary frame, and a curved guide on the rear of the main frame for movably supporting the rear end of the subsidiary frame.

6. The combination with a side car chassis having pivotal connections with the lower part of a motor cycle frame, of a wheel supporting the outer part of the chassis, a stay connecting the chassis to the upper part of the cycle frame, and means for shortening or lengthening the said stay to tilt the cycle to and from the chassis when the said cycle is in motion.

7. The combination with a side car chassis having pivotal connections with the lower part of a motor cycle frame, of a wheel supporting the outer part of the chassis, a stay connecting the chassis to the upper part of the cycle frame, and means operated from the engine of the cycle for shortening and lengthening the said stays to tilt the cycle to and from the chassis when the said cycle is in motion.

8. In a side car chassis a main frame having lateral extensions at its forward and rear ends, a subsidiary frame having its front end pivoted to the forward extension and its rear end supporting a side car wheel, and semi-elliptic springs fitted to the subsidiary frame and having their rear ends movably mounted in a curved guide fitted to the rear extension.

9. A side car chassis comprising a main frame adapted to be pivotally connected to the frame of a motor cycle, lateral extensions on the forward and rear parts of the main frame, an oscillating bracket mounted on a vertical pin carried by the forward extension, a subsidiary frame having its front end pivoted horizontally on the oscillating bracket and a side car wheel supported on its rear end, a pair of semi-elliptic springs fitted to the rear end of the subsidiary frame and having their front ends pivoted horizontally to the said bracket, a bar connecting the rear ends of the springs, and a curved guide mounted on the rear extension of the frame adapted to movably support the said bar, substantially as described.

10. The combination with a side car chassis having pivotal connections with the lower part of a motor cycle frame, of an extensible stay connecting the cycle frame to the chassis formed of two parts and having a screw connection, a gear wheel on the lower part of the stay, a flexible spindle having a gear wheel fitted to one end and meshing with the gear wheel on the stay, a friction wheel on the opposite end of the spindle, an engine shaft having friction disks thereon, and means controlled by hand levers for placing the friction gear in and out of action, substantially as described.

11. The combination with a side car chassis having a pivotal connection with the lower part of the frame of a motor cycle, of an extensible stay for connecting the upper part of the cycle frame to the inner side of the chassis, the upper part of the said stay having a pivotal connection with the cycle frame and a screwed part at its lower end engaging a screwed rod forming the second part of the said stay, a bracket on the chassis supporting the screwed rod, a gear wheel on the rod meshing with a second gear wheel on a spindle carried by the said bracket, a flexible shaft connecting the said spindle to a spindle carrying a friction wheel, a movable member supporting the friction wheel, a pair of friction disks on the crank shaft of the engine of the cycle, and means for placing the friction wheel in contact with either of the friction disks to cause the extensible stay to be lengthened or shortened to tilt the chassis as desired.

12. The combination with the subject matter of the preceding claiming clause 11 of a bracket fitted to the crank case of the engine supporting a flexible member, an open frame fitted to the flexible member, bearings on the open frame supporting the spindle of the friction wheel, an upward extension on the open frame, a guide bracket for the said extension, and Bowden wires connecting the said extension to hand levers on the handle bars of the cycle, substantially as described.

13. The combination with a side car chassis having a pivotal connection with the lower part of a motor cycle frame, of an extensible stay formed in two parts connecting the upper part of the cycle frame to the inner side of the chassis, a screw connection between the two parts of the stay, mechanism driven from the motor on the crank shaft of the cycle for lengthening or shortening the said stay, and hand controlled means for putting the said mechanism in and out of gear, substantially as described.

In testimony whereof we have affixed our signatures in the presence of two witnesses.

ALBERT SAMUEL SWAN.
JOHN ALBERT YEATS.

Witnesses:
  CLEM A. HACT,
  G. R. CULLEN.